United States Patent [19]
Duerr et al.

[11] 3,821,400
[45] June 28, 1974

[54] METHOD OF CONTROLLING GASTROPODS

[75] Inventors: Dieter Duerr, Bottmingen; Hans Aebi, Reinach/Basel-land; Ludwig Ebner, Stein/AG, all of Switzerland

[73] Assignee: Ciba-Geigy AG, Basel, Switzerland

[22] Filed: Mar. 20, 1968

[21] Appl. No.: 714,406

Related U.S. Application Data

[63] Continuation-in-part of Ser. No. 424,820, Jan. 11, 1965, abandoned.

[30] Foreign Application Priority Data
Jan. 13, 1964 Switzerland.......................... 306/64
Aug. 12, 1964 Switzerland...................... 10543/64

[52] U.S. Cl.................................. 424/304, 71/83
[51] Int. Cl. ............................................. H01n 9/12
[58] Field of Search .................................... 424/304

[56] References Cited
UNITED STATES PATENTS
3,238,092   3/1966   Boyce et al............................ 424/230
3,287,102   11/1966   Olin....................................... 71/98

*Primary Examiner*—Albert T. Meyers
*Assistant Examiner*—Leonard Schenkman
*Attorney, Agent, or Firm*—Frederick H. Rabin; Edward J. Sites; Joseph G. Kolodny

[57] ABSTRACT

Molluscicidal preparations are provided containing a suitable carrier with, as the active agent, a compound of the formula

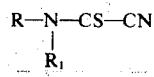

wherein R is selected from the group consisting of unsubstituted phenyl, substituted phenyl and naphthyl, $R_1$ is hydrogen, lower alkyl, alkenyl, aralkyl or an acidifying group; or the salts of these compounds with inorganic or organic bases.

2 Claims, No Drawings

METHOD OF CONTROLLING GASTROPODS

CROSS REFERENCE

This is a continuation-in-part of our application Ser. No. 424,820 filed Jan. 11, 1965 now abandoned.

The present invention relates to new preparations for combating pests, especially harmful insects, acarides, nematodes, molluscs and microorganisms, especially phytopathogenic fungi and bacteria, for controlling undesired plant growth, and preparations for defoliating cotton.

The present invention provides a preparation for combating pests which comprises as active substance a compound of the general formula

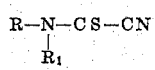

in which R represents a mononuclear or binuclear aromatic radical which may be substituted by one or more halogen atoms, a lower alkyl group, an alkoxy group, a halogenoalkyl or an alkylmercapto group or by the groups $-NO_2$, $-CN$,

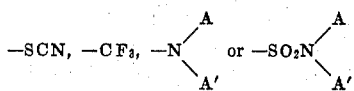

(wherein A and A' each represents a hydrogen atom and/or a lower alkyl group), and $R_1$ represents a hydrogen atom, a lower alkyl, or alkenyl group containing 1 to 4 carbon atoms, an aralkyl group, an acyl group or aroyl group or the group

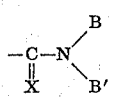

(wherein X stands for oxygen or sulfur, B and B' are identical or different and each represents hydrogen, a lower alkyl or aryl group) or the group

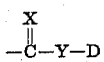

(wherein X and Y are identical or different and each represents oxygen or sulfur, and D stands for a lower alkyl group, an aralkyl or an aryl group) or salts of such compounds with inorganic and organic bases together with a suitable carrier.

The preparations may also contain, if desired, one or more of the following additives: a vehicle, a solvent diluent, a dispersant, a wetting agent, an adhesive, a fertilizer and other pesticides.

As mentioned above, the radical R may be unsubstituted or substituted, for example it may be substituted by one or more halogenoalkyl or alkylmercapto groups. If $R_1$ is an alkyl group, it may be interrupted by an oxygen or sulfur atom. If the radicals B, B' and/or D represent aryl radicals, they may contain the same substituents as the radical R. If $R_1$ is aliphatic, it may contain halogen atoms.

By virtue of their broad biocidal activity, the new preparations have the special advantage that they can be used for combating a very wide variety of vegetable and animal pests.

They are not only suitable as herbicides but, when used in a concentration that is insufficient to produce phytotoxic effects, they are extremely active against harmful microorganisms, for example fungi such as Alternaria solani, Phytophthora infestans and Septora apii, and also against harmful insects, acarides, molluscs, nematodes and their ova and larvae.

Quite generally, the new preparations may also be used as microbicides, for example against Aspergillus species and as insecticides, for example against midges and flies.

In the manufacture of solutions of the compounds of the general formula (I) ready for spraying there may be used, for example, petroleum fractions having a medium to high boiling range, for example Diesel oil or kerosene, coal tar oil and oils of vegetable or animal origin, as well as hydrocarbons, for example alkylated naphthalenes, or tetrahydronaphthalene, if desired in admixture with xylene mixtures, cyclohexanols or ketones, also with chlorinated hydrocarbons for example trichloroethane and tetrachloroethane, trichloroethylene or tri- and tetrachlorobenzene. It is advantageous to use organic solvents that boil above 100°C.

It is especially advantageous to prepare aqueous forms of application by adding water to emulsion concentrates, pastes or wettable spray powders. Suitable emulsifiers or dispersants are non-ionic products for example condensation products of ethylene oxide with aliphatic alcohols, amines or carboxylic acids having a long hydrocarbon chain containing about 10 to 20 carbon atoms for example the condensation product of octadecyl alcohol with 25 to 30 mols of ethylene oxide, or of soybean fatty acid with 30 mols of ethylene oxide, or of commercial oleyl-amine with 15 mols of ethylne oxide, or of dodecylmercaptan with 12 mols of ethylene oxide. A suitable anionic emulsifiers, there may be mentioned for example, the sodium salt of dodecyl alcohol sulfuric acid ester, the sodium salt of dodecyl-benzene-sulfonic acid, the potassium or triethanolamine salt of oleic acid or abietic acid or of a mixture of these two acids, or the sodium salt of a petroleumsulfonic acid. Suitable cationic dispersants are quaternary ammonium compounds, for example cetyl pyridinium bromide or dihydroxyethyl benzyldodecyl ammonium chloride.

In the manufacture of dusting and casting preparations, there may be used as solid vehicles: talcum, kaolin, bentonite, calcium carbonate, calcium phosphate or coal, cork meal, wood meal or other materials of vegetable origin. It is also very advantageous to manufacture preparations in granular form. The various forms of application may further contain the usual additives capable of improving the distribution, adhesion, stability to rain or penetration; as such substances there may be mentioned fatty acids, resins, glue, casein or alginates.

The preparations of the invention may be used by themselves or in conjunction or in admixture with other conventional pesticides, especially insecticides, acaricides, nematocides, molluscicides, bactericides, fungicides and/or herbicides.

Particularly suitable for combating harmful insects and their ova are those new preparations which contain as active substance, a compound of the formula

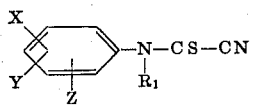

in which X and Y are identical or different and each represents a hydrogen or chlorine atom, or a methyl, methoxy or ethoxy group, Z may represent a hydrogen atom or a dimethylamino group and $R_1$ a hydrogen atom or a methyl, ethyl, allyl or crotyl group. In this connection, there may be specially mentioned those preparations which contain as active substance, a compound of the formula

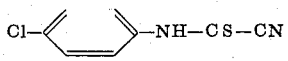

or

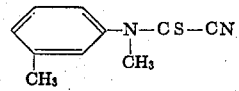

or

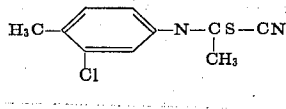

Harmful microorganisms, especially phytopathogenic microorganisms, can be combated especially effectively with those new preparations which contain as active substance a compound of the formula

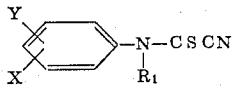

in which X and Y are identical or different, and each represents a chlorine atom or an alkyl group or an alkoxy group having one to four carbon atoms, or X stands for hydrogen and Y for the dimethylamino group, and $R_1$ represents a hydrogen atom or a methyl group, an ethyl group, an allyl group, a benzyl group, a chlorobenzyl group or a methylbenzyl group. In this connection, there should be specially mentioned those preparations in which the active substance is one of the following compounds:

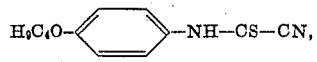

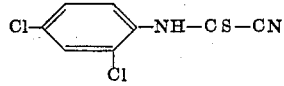

and

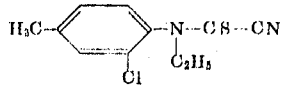

Especially good results in the selective or total herbicidal control or undesired plant growth are those preparations of the invention which contain, as active substance, a compound of the formula

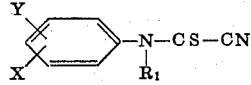

in which X and Y are identical or different, and each represents a chlorine atom, or an alkyl or alkoxy group containing one to four carbon atoms, or the group —$CF_3$, and $R_1$ represents a hydrogen atom, or a methyl or ethyl group, a lower carbalkoxy group, or a carbamoyl group substituted by one or two lower alkyl radicals.

Preparations especially suitable for defoliating cotton are, for example, those which contain as active substance a compound of the formula

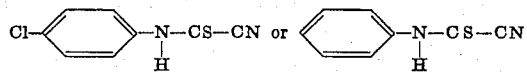

Harmful or undesired molluscs can be combated particularly effectively with those compounds of the formula (I) in which R represents the α-naphthyl radical or a phenyl group substituted by chlorine, methyl and-/or trifluoromethyl groups, and $R_1$ represents a hydrogen atom or a methyl, ethyl or crotyl group.

As compounds having a good acaricidal effect there may be mentioned, for example, the new compounds of the general formula (I) in which R represents a phenyl radical substituted by one to three halogen atoms or by a methoxy group, and $R_1$ represents hydrogen, a methyl, ethyl or crotyl group.

The present invention further includes the new compound of the general formula

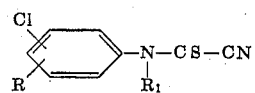

in which R represents a chlorine atom, the group $CF_3$, a lower alkyl group, or a lower alkoxy group, and $R_1$ represents a hydrogen atom, a methyl, ethyl, or allyl radical or the group

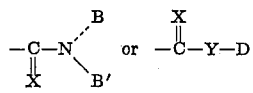

(wherein B, B', D, X and Y have the above meanings); furthermore the compounds of the formula

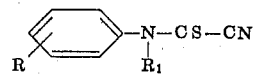

in which R represents a chlorine atom or an alkoxy group containing one to four carbon atoms, an alkyl radical containing two to four carbon atoms or the group —CF$_3$, and R$_1$ represents hydrogen atom, or a methyl, ethyl or crotyl group,

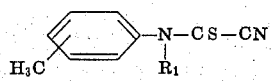

wherein R$_1$ represents a methyl or ethyl group, and

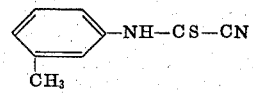

The new compounds can be manufactured by adding an isothiocyanate to an aqueous solution of an alkali metal or alkaline earth metal cyanide, in the presence of a water-miscible solvent. The reaction consists in a simple addition of the components according to the scheme:

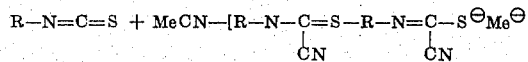

in which R has the same meaning as in the above general formula (I).

There are obtained solutions of the corresponding metal salts, from which the free thioamide can be liberated by acidification. The N-alkylation is carried out in the usual manner, for example with the aid of an alkylhalide or dialkylsulfate.

The N-acylation can be achieved with the aid of an acid anhydride or acid halide. If it is desired to introduce a carbamoyl group, this can be done with the aid of a suitable isocyanate or an N-substituted or N,N-disubstituted carbamylhalide.

A carbalkoxy or carbaralkoxy or carbaroxy group can be introduced with the aid of a suitable halogenocarbonate, for example a haloformic acid ester.

The following Examples illustrate the invention:

EXAMPLE 1 a. N-Cyanthioformyl-3,4-dichloroaniline 36.7 grams of 3,4-dichlorophenylisothiocyanate in 100 ml of alcohol were stirred for 4 hours with a solution of 13 grams of potassium cyanide in 150 ml of water, while cooling to maintain the temperature at 30°C. A dark solution of the potassium salt was obtained, which was diluted with 800 ml of water and acidified with concentrated hydrochloric acid, whereupon the free thioamide precipitated in the form of orange-yellow crystals. The yield of crude product was substantially quantitative. In order to purify the product, it was recrystallized from benzene. It decomposed at 164°C.

b. N-Cyanothioformyl-4-chloro-3-trifluoromethyl-aniline

A mixture of 215 grams of 4-chloro-3-trifluoromethylphenyl isothiocyanate, 60 grams of potassium cyanide, one-half liter of water and 200 ml of methanol was stirred for 12 hours at room temperature, then filtered, the filtrate dilute with water to about twice its initial volume, acidified with concentrated hydrochloric acid, and the precipitate formed was filtered off. It formed orange-yellow crystals melting at 130° to 132°C (from benzene + petroleum ether).

EXAMPLE 2 a. 123 grams of 2,4-dichlorophenyl mustard oil, 250 ml of methanol, 250 ml of water and 39 grams of potassium cyanide were stirred until a homogeneous solution had formed which was filtered and then used for the following reactions after having been divided into three equal portions.

b. N-Cyanothioformyl-2,4-dichloroaniline

One third of the above solution was diluted with one-half liter of water, and rendered acid to Congo red with 4N-hydrochloric acid. The resulting precipitate of thioamide was collected and dried. Yield: 42.2 grams. After recrystallization from benzene+petroleum ether, the product decomposed at 121°C.

c. N-Cyanothioformyl-N-methyl-2,4-dichloroaniline

The second portion of the reaction solution obtained under (a) above was mixed with 20 ml of dimethylsulfate while being vigorously stirred. A reaction set in, the whole heated up and the batch solidified; it was then diluted with 200 ml of 1:2-alcohol+water, and after 5 hours the yellow crystals of the thioamide were suctioned off. Recrystallization from aqueous alcohol yielded 33 grams of the product melting at 75° to 76°C.

d. N-Cyanothioformyl-N-ethyl-2,4-dichloroaniline

The third portion of the reaction solution obtained under (a) above was stirred for 5 hours with 26 ml of diethyl sulfate. The resulting reaction solution was diluted with 600 ml of water, and the precipitated oil was isolated and distilled under vacuum; it boiled at 108°C under a pressure of 0.09 mm Hg. Yield: 32.5 grams.

The following compounds were likewise manufactured by the methods described and used in Examples 1 and 2.

TABLE I

| No. | R= | R$_1$= | Melting or decomposing point, °C. | B.P., °C./mm. Hg |
|---|---|---|---|---|
| 1 | ⬡ | H | | |
| 2 | Same as above | CH$_3$ | 82° | 84°/0.15 |
| 3 | do | C$_2$H$_5$ | | 82°/0.13 |
| 4 | ⬡⬡ | H | 136–137° | |
| 5 | ⬡-CF$_3$ | H | 92° | |
| 6 | Same as above | CH$_3$ | | 89–91°/0.15 |
| 7 | CF$_3$-⬡-CF$_3$ | H | 106° | |
| 8 | Same as above | CH$_3$ | | 102°/0.05 |
| 9 | Cl-⬡ | H | 121–122.5° | |
| 10 | Same as above | CH$_3$ | | 106–108°/0.23 |
| 11 | do | C$_2$H$_5$ | | 92–94°/0.05 |
| 12 | Cl-⬡-Cl | CH$_3$ | 72–76° | 123°/0.11 |

TABLE I—Continued

| No. | R= | R₁= | Melting or decomposing point, °C. | B.P., °C./mm. Hg |
|---|---|---|---|---|
| 13 | Same as above | | | 120°/0.03 |
| 14 | 4-Cl-C₆H₄- | H | 88–91.5° | |
| 15 | Same as above | CH₃ | | 94.5°/0.12 |
| 16 | do | C₂H₅ | | 103–105°/0.09 |
| 17 | 4-CH₃-C₆H₄- | H | 69–71.5° | |
| 18 | Same as above | CH₃ | | 91–93°/0.06 |
| 19 | do | C₂H₅ | | 95–97°/0.01 |
| 20 | 3-CH₃-4-Cl-C₆H₃- | H | 134–135.5° | |
| 21 | Same as above | CH₃ | 52–53° | 121°/0.10 |
| 22 | do | C₂H₅ | | 104°/0.02 |
| 23 | 4-C₄H₉-O-C₆H₄- | H | 84.5–85° | |
| 24 | Same as above | CH₃ | | 148–150°/0.6 |
| 25 | do | C₂H₅ | | 144–145°/0.27 |
| 26 | 4-CH₃-O-C₆H₄- | H | 118–120° | |
| 27 | Same as above | CH₃ | | 108°/0.01 |
| 28 | do | C₂H₅ | | 108–109°/0.035 |
| 29 | 2-Cl-C₆H₄- | H | 108–110.5° | |
| 30 | Same as above | CH₃ | | 96°/0.06 |
| 31 | do | C₂H₅ | | 107–108°/0.45 |
| 32 | 3-CH₃-C₆H₄- | H | 126.5–128.5 | |
| 33 | Same as above | CH₃ | | 89–90°/0.2 |
| 34 | do | C₂H₅ | | 164–166°/14 |
| 35 | 4-C₂H₅O-C₆H₄- | H | 114.5–115.5° | |
| 36 | Same as above | CH₃ | 53–54° | |
| 37 | do | C₂H₅ | | 137°/0.1 |
| 38 | 3-CH₃-O-4-Cl-C₆H₃- | H | 143° | |
| 39 | Same as above | CH₃ | 79–80.5° | |
| 40 | do | C₂H₅ | | 143–145°/0.3 |
| 41 | 4-C₄H₉-C₆H₄- | H | 73–75° | |
| 42 | Same as above | CH₃ | | 114–116°/0.2 |
| 43 | do | C₂H₅ | | 126°/0.2 |
| 44 | 3-Cl-4-CF₃-C₆H₃- | H | 130–132° | |
| 45 | Same as above | CH₃ | | 104–106°/0.1 |
| 46 | do | C₂H₅ | | 103°/0.015 |
| 47 | 2-CH₃-C₆H₄- | H | 64–65° | |
| 48 | Same as above | CH₃ | | 83°/0.02 |
| 49 | do | C₂H₅ | | 83°/0.02 |
| 50 | 2-OCH₃-C₆H₄- | H | 108–109° | |
| 51 | Same as above | CH₃ | | 103°/0.1 |
| 52 | do | C₂H₅ | | 115°/0.09 |
| 53 | 2-OC₂H₅-C₆H₄- | H | 76.5° | |
| 54 | Same as above | CH₃ | | 124°/0.9 |
| 55 | do | C₂H₅ | | 114°/0.18 |
| 56 | 3,4-(CH₃)₂-C₆H₃- | H | 125° | |
| 57 | Same as above | CH₃ | | 105°/0.07 |
| 58 | do | C₂H₅ | | 108°/0.08 |
| 59 | 4-N(CH₃)₂-C₆H₄- | H | 124° | |
| 60 | Same as above | CH₃ | 77.5–78.5° | |
| 61 | do | C₂H₅ | | 162–164°/0.68 |
| 62 | 2-Cl-5-CF₃-C₆H₃- | H | 82–83° | |
| 63 | Same as above | CH₃ | | 78°/0.013 |
| 64 | do | C₂H₅ | | 95°/0.05 |
| 65 | 3-O₂N-C₆H₄- | H | 99–102° | |
| 66 | Same as above | CH₃ | 81.5–82° | |
| 67 | 4-O₂N-C₆H₄- | H | 61–62° | |
| 68 | 3-H₂N-O₂S-C₆H₄- | H | 168° | |
| 69 | 2-Cl-3-CH₃-C₆H₃- | H | 120° | |
| 70 | Same as above | CH₃ | | 92°/0.05 |
| 71 | 2,4-Cl₂-C₆H₃- | H | 132° | |
| 72 | Same as above | CH₃ | 75–76° | |
| 73 | do | C₂H₅ | | 123°/0.32 |
| 74 | 2-CH₃-4-NO₂-C₆H₃- | H | 76–77.5° | |
| 75 | 2-CH₃-5-Cl-C₆H₃- | H | 107° | |
| 76 | Same as above | CH₃ | 67–67.5° | |

TABLE I—Continued

| No. | R= | R₁= | Melting or decomposing point, °C. | B.P., °C./mm. Hg |
|---|---|---|---|---|
| 77 | Br-C₆H₄- | H | 133.5–135° | |
| 78 | Same as above | CH₃ | | 108°/0.08 |
| 79 | Cl,Cl,Cl-C₆H₂- | H | 135° | |
| 80 | O₂N-, Cl-C₆H₃- | H | 135–137° | |

Using those compounds in which $R_1$ represents a hydrogen atom, there were prepared salts with alkali, alkaline earth and heavy metals, or solutions or suspensions of such salts, whose effect was approximately equivalent to that of the free acids.

The primarily formed salt solutions can, if desired, be used as they are without prior isolation of the salts, if necessary with addition of an emulsifier.

The alkylsulfates may be replaced by other alkylating agents. Thus, for example, when a suitable allylchloride, benzylchloride or chlorodimethyl ether was used under the conditions described in Example 2 (d), the following compounds were obtained:

TABLE II

| No. | R= | R₁= | B.P. °C./mm. Hg | M.P., °C. |
|---|---|---|---|---|
| 81 | C₆H₅- | Benzyl | 145°/0.03 | |
| 82 | Same as above | 3,4-dichlorobenzyl | 189°/0.5 | |
| 83 | do | Allyl | 89°/0.02 | |
| 84 | do | α-Chloroallyl | 114°/0.11 | |
| 85 | do | Methoxymethyl | 108°/0.09 | |
| 86 | CH₃-C₆H₄- | Benzyl | 147°/0.04 | |
| 87 | Same as above | 4-chlorobenzyl | 176°/0.25 | |
| 88 | do | 2-chlorobenzyl | | 76.5° |
| 89 | do | Allyl | 150°/8 | |
| 90 | do | α-Chloroallyl | 116°/0.07 | |
| 91 | CH₃-C₆H₄- | Benzyl | 156°/0.07 | |
| 92 | Same as above | 4-chlorobenzyl | 175°/0.28 | |
| 93 | do | 2-chlorobenzyl | 174°/0.22 | |
| 94 | do | Allyl | 99°/0.06 | |
| 95 | do | α-Chloroallyl | 120°/0.07 | |
| 96 | (CH₃)₂N-C₆H₄- | Benzyl | | 57.5° |
| 97 | Same as above | Allyl | 170°/0.56 | |
| 98 | CH₃O-C₆H₄- | Benzyl | | 83° |
| 99 | Same as above | Allyl | 134°/0.15 | |
| 100 | OC₂H₅-C₆H₄- | Allyl | 123°/0.1 | |
| 101 | Same as above | α-Chloroallyl | 123°/0.08 | |

TABLE II—Continued

| No. | R= | R₁= | B.P. °C./mm. Hg | M.P., °C. |
|---|---|---|---|---|
| 102 | Naphthyl | Allyl | 155°/0.02 | |
| 103 | Same as above | Ethyl | 134°/0.02 | |

EXAMPLE 3

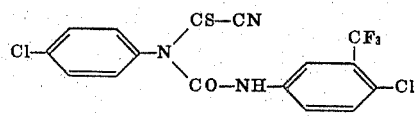

A few drops of an organic base, for example triethylamine, were added to a solution of 23.6 grams of the compound 9 in 300 ml of dry benzene, whereupon a solution of 27 grams of 4-chloro-3-trifluoromethyl phenylisocyanate in 50 ml of dry benzene was added dropwise during 10 minutes at 30°C. When the batch was left to stand for some time, the reaction product crystallized out partially and was filtered off. Further material was obtained on evaporation of the mother liquor. On recrystallisation from benzene the product formed yellowish crystals melting a 151° to 152°C. Yield: 39g.

In an identical manner, using the corresponding starting materials, the following substances were manufactured:

TABLE III

| No. | R= | R₁= | M.P., °C. |
|---|---|---|---|
| 104 | C₆H₅- | —CO—NH—CH₃ | 135–136° |
| 105 | Same as above | —CO—NH—C₆H₂Cl₃ | 192–193° |
| 106 | CH₃-C₆H₄- | —CO—NH—CH₃ | 124–125° |
| 107 | Same as above | —CO—NH—C₆H₄—Cl | 122–123° |
| 108 | CH₃-C₆H₄- | —CO—NH—CH₃ | 138–139° |
| 109 | Same as above | —CO—NH—C₆H₄—Cl | 186–187° |
| 110 | Cl-C₆H₄- | —CO—NH—CH₃ | 142–143° |
| 111 | Same as above | —CO—NH—C₆H₅ | 131–131.5° |
| 112 | do | —CO—NH—C₆H₄—Cl | 160–161° |
| 113 | Cl-C₆H₄- | —CO—NH—CH₃ | 138–138.5° |

TABLE III—Continued

| No. | R = | R₁ = | M.P., °C. |
|---|---|---|---|
| 114 | 2,4-diClC₆H₃ | —CO—NH—CH₃ | 145–146° |
| 115 | Same as above | —CO—NH—C₆H₅ | 159–160° |
| 116 | 3,4-diClC₆H₃ | — | 191–192° |
| 117 | 3-CF₃-C₆H₄ | — | 102.5–103° |
| 118 | 2-Cl-C₆H₄ | —CO—NH—CH₃ | 120–121.5° |
| 119 | 2-Cl-4-CH₃-C₆H₃ | — | 149–149.5° |
| 120 | 4-OCH₃-C₆H₄ | — | 131–132° |
| 121 | 4-OC₂H₅-C₆H₄ | —CO—NH—CH₃ | 146–147.5° |
| 122 | Same as above | —CO—NH—C₆H₅ | 131–132.5° |
| 123 | do | —CO—NH—(2,4,5-triCl-C₆H₂) | 191° |
| 124 | 4-Cl-2-CF₃-C₆H₃ | —CO—NH—CH₃ | 116–117° |
| 125 | Same as above | —CO—NH—(4-Cl-C₆H₄) | 145–146° |
| 126 | do | —CO—NH—(3-Cl-C₆H₄) | 120–121° |
| 127 | 2,4-diCl-C₆H₃ | —CO—NH—CH₃ | 163–164° |
| 128 | Same as above | —CO—NH—C₆H₅ | 192–193° |
| 129 | do | —CO—NH—C₆H₅ | 183–184° |
| 130 | 2,4-diCl-C₆H₃ | —CS—NH—(2,4-diCl-C₆H₃) | 179–182° |

EXAMPLE 4

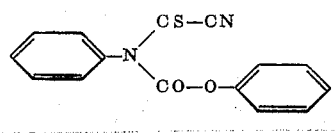

25 ml of 10N-sodium hydroxide solution were added to a solution of 40.5 grams of compound 1 in 150 ml of dioxane, and while cooling with ice, 39.2 grams of phenylchlorocarbonate were run in the course of 10 minutes. After 30 minutes, the products was precipitated in the form of red-brown crystals by adding about 1 liter of ice water. The crude product can be purified by recrystallization from mixtures of benzene and petroleum ether, if necessary with the aid of animal charcoal. Yield: 71 percent of the theoretical yield. The product melted at 145° to 146°C.

In an identical manner, using the corresponding starting materials, the following compounds were manufactured:

TABLE IV

| No. | R= | R₁= | Melting or decomposing point, °C. |
|---|---|---|---|
| 131 | C₆H₅ | —CO—OCH₃ | 129–130° |
| 132 | Same as above | —CO—OC₂H₅ | 108–109° |
| 133 | 3-CH₃-C₆H₄ | —CO—OCH₃ | 143–146° |
| 134 | Same as above | —CO—OC₂H₅ | 105–106° |
| 135 | do | —CO—OC₄H₉ (i) | 67–68° |
| 136 | 4-CH₃-C₆H₄ | —CO—OCH₃ | 108–109.5° |
| 137 | Same as above | —CO—OC₂H₅ | 87–89° |
| 138 | do | —CO—OC₆H₅ | 138–139° |
| 139 | 2-Cl-C₆H₄ | —CO—OCH₃ | 156–158° |
| 140 | Same as above | —CO—OC₂H₅ | 102–103° |
| 141 | 4-Cl-C₆H₄ | —CO—OCH₃ | 121–123° |
| 142 | Same as above | —CO—OC₂H₅ | 119–120° |
| 143 | do | —CO—OC₆H₅ | 129–130° |
| 144 | 2,4-diCl-C₆H₃ | —CO—OCH₃ | 135–136° |
| 145 | Same as above | —CO—OC₂H₅ | 122.5–124.5° |
| 146 | 4-CH₃O-2-Cl-C₆H₃ | —CO—OCH₃ | 162–163° |
| 147 | 4-CH₃-2-Cl-C₆H₃ | —CO—OC₆H₅ | 138.5–139.5° |

EXAMPLE 5

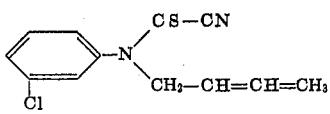

a. N-Cyanoformyl-3-chloroaniline:

A mixture consisting of 750 ml of methanol, 1000 ml of water, 200 g of potassium cyanide and 510 g of m-chlorophenylisocyanate is stirred for 15 hours at room temperature. The reaction product is diluted with 2000 ml of water, the minor impurities are filtered off, and the filtrate is slowly acidified by the addition of concentrated hydrochloric acid while stirring. The crystal mass formed is suctioned off and washed with water until neutral. Drying is effected under vacuum at 30°C. Yield 540 g; melting point 86° to 91°C. Recrystallisation from a mixture of chloroform and petroleum-ether brings the melting point to 89° to 91.5°C.

b. Crotylisation:

46.5 g of product (a) are stirred together with 100 ml of methanol, 150 ml of water 25.4 g of 86 percent potassium hydroxide and 55.5 g of crotylbromide at 60°C. Three hours later 500 ml of water are added and the oil formed is separated. The aqueous phase is extracted once with chloroform, the chloroformic solution added to the separated oil, and the whole dried over sodium-sulfate. After being filtered off from the siccative the oily phase is destilled under reduced pressure. Yield: 69.5 g of N-cyanothioformyl-N-crotyl-3-chloroaniline; boiling point 125°C at 0.2 mmHg.

EXAMPLE 6

10 Parts each of one of the compounds of Example 1 and 2 were mixed with 20 parts of xylene and 10 parts of a mixture of an anionic surface-active compound, preferably the calcium or magnesium salt of monolaurylbenzene-monosulfonic acid, with a non-ionic surface-active compound, preferably a polyethyleneglycol ether of the monolauryl ester of sorbitol, and then diluted with xylene to 100 cc. A clear solution was obtained which could be used as a spray concentrate, and could be emulsified by being poured into water.

EXAMPLE 7

A. Herbicidal effect

Earthenware pots filled with earth were seeded in a greenhouse with the following seeds: Avena sativa, Setaria italica, Sinapis arvensis and Lepidium sativum.

a. The pre-emergence treatment was carried out 1 day after seeding, with spray broths prepared as described in Example 6 which contained, as active substances, the compounds of Example 2(b) and with compounds nos. 13, 15 and 16 in Table 1. The amount sprayed corresponded to 30 kilograms of active substance per hectare. The results achieved were assessed about 20 days after treatment.

b. The post-emergence treatment of the abovementioned plants was carried out as described under (a) above, but only about 10 to 12 days after seeding, when the plants had developed the second leaf. The amount sprayed corresponded to 10 kilograms of active substance per hectare. The results were assessed about 18 days after treatment. The results obtained are known in the following Tables:

(a) Pre-emergence treatment

| Plant tested | Amount sprayed in kilograms per hectare | Ex. 2(b) | Ex.2 Tb.I No. 13 | Ex.2 Tb.I No. 15 | Ex.2 Tb.I No. 16 |
|---|---|---|---|---|---|
| Avena sativa | 30 | 3 | 4 | 10 | 10 |
| Setaria italica | 30 | 5 | 10 | 10 | 10 |
| Sinapis arvensis | 30 | 10 | 3 | 8 | 8 |
| Lepidium sativum | 30 | 10 | 7 | 10 | 9 |

(b) Post-emergence treatment

| Plant tested | Amount sprayed in kilograms per hectare | Ex. 2(b) | Ex.2 Tb.I No. 13 | Ex.2 Tb.I No. 15 | Ex.2 Tb.I No. 16 |
|---|---|---|---|---|---|
| Avena sativa | 10 | 10 | 4 | 6 | 3 |
| Setaria italica | 10 | 10 | 10 | 10 | 10 |
| Sinapis arvensis | 10 | 10 | 10 | 10 | 10 |
| Lepidium sativum | 10 | 10 | 10 | 5 | 6 |

Classification: 0 = no effect   10 = plant completely killed off

A similar good effect was also obtained with compound Nos. 5, 9, 10, 14, 16, 17, 20, 21, 23, 26, 29, 32, 38 and 41 of Table I of Example 2.

Similar good results were also obtained when using compounds Nos. 13, 30, 45, 47, 50, 56, 62, 71, 73, 104 and 132 shown in Tables I to IV and with the compound of the formula

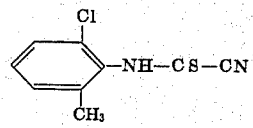

(decomposes at 120°C)

(B) Ovicidal effect

Compounds Nos. 2, 3, 9, 10, 11, 12, 13, 15, 16, 18 and 21 shown in Table I of Example 2 destroyed completely the ova of Ephestia Kuehniella (flour moth) even at as low a concentration as 0.0125 percent.

Compounds 27, 28, 34, 36 and 97 were equally effective.

Good effects against flour moth ova and the ova of Aphis pomi in open country were achieved with compounds 10, 12 and 20. Compound No. 21 proved effective against the afore-mentioned pests and the ova of winter moth, and compound No. 18 against the flour moth and winter moth. The following compounds proved to be potent acaricides: Nos. 10, 11, 13, 16, 52 and 79.

(C) Fungicidal effect

The cotyledons of Cucumis pepo and young tomato plants were treated with a suspension prepared according to Example 3, containing 0.2 percent of the active substance No. 23 shown in Table I of Example 2.

2 Days after the treatment, the cotyledons of Cucumis pepo were infested with spores of Erysiphe cichloriacearum and the tomato plants with a spore suspension of Alternaria solani.

5 Days after infection of the tomato plants, the tomatoes treated with the spray broth of Example 3 were completely clear in contrast to the control plants which were strongly infested. An assessment of the result achieved, made 12 days later on the cucumber plants, revealed a 95 percent success against Erysiphe cichoriacearum. A similar good result was also obtained with compounds 22 and 31 of Table I in Example 2(b).

Good fungicidal effects were also obtained with compounds 23, 25, 41, 52, 60, 61, 71, 75, 76, 81, 86, 91, 92, 93, 100 and 103 and with the compound of the formula

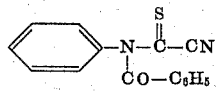

(D) Defoliation of cotton

A cotton field was treated with a spray broth prepared as described in Example 3, containing 0.5 percent of compound No. 9 of the Table of Example 2. Within 7 days a defoliation effect of at least 80 percent of the cotton plants was achieved.

(E) Acaricidal effect

The compound of Example 5 was formulated in the usual manner.

To check its acaricidal effect, Phaseolus plants in the 2-leaf stage are infested 12 hours before the treatment by covering them with pieces of leaves infested by a mite species (*Tetranychus telarius;* carmine red mite.) 12 Hours later, the test plant was found to be covered with mites in all stages of development. The active substance, in the form of an emulsion, was sprayed with the aid of a fine sprayer over the plants in a manner such that a uniform layer of droplets was formed on the leaf surface. The mortality was checked 2 and 7 days later and expressed in percent. The effect upon ova after the test had been run for 2 days as described cannot be stated because the average time taken by the larvae to leave the ova has not yet been established.

At a concentration of 0.08 percent of active substance the following mortality values were found:

|  | Ova | Larvae | Adults |
|---|---|---|---|
| after 2 days | — | 100 % | 100 % |
| after 7 days | 100 % | 100 % | 100 % |

Equally good results were obtained with compounds nos. 10, 11, 12, 13, 15, 16, 18, 20, 21, 27, 28, 34, 36, 52, 79, 97, 144.

EXAMPLE 8

(a) A mixture of the following composition was prepared
- 50 parts of the compound of Example 1(b) (active substance)
- 11 parts of ammonium lignine sulfonate
- 4.5 parts of sodium aryldisulfonate
- 0.2 part of isooctylphenyl-polyethoxy-ethanol.

This mixture was ground with 34.3 grams of chalk or kaolin in a rod mill. The resulting concentrate could be diluted with water in any desired proportion to form a stable dispersion.

(b) 8 Snails (*Australorbis glabratus*), whose shells measured 1 to 1.5 cm in diameter, were kept for 24 hours in 450 cc of an aqueous dispersion prepared as under (a) above, containing 1 part per million of the active substance. After this treatment the snails were transferred to fresh water and inspected in it 24 hours later. In all cases at least 50 percent of the snails were found to have been killed.

Equally good results were obtained with compounds Nos. 4, 6, 8, 10, 12, 14, 15, 21, 22 and 46 and with the compound of Example 1(a).

The following genera and species of snails can be successfuly combated with such compounds and those of similar constitution: Edible snails (Helix), common European black slug (arion), salad slugs, gastropon molluscs (Limax), Deroceras, Biharzia slugs, Planorbis, Bulinus, Biomphalaria and the like.

EXAMPLE 9

Several of the compounds obtained by the present invention were tested for the action against the following bacteria and fungi:

*Staphylococcus aureus, Escherichia coli, Aspergillus niger* and *Rhizopus nigricans.* In these tests, the following compounds proved efficacious in a concentration of 100 parts per million or less: Nos. 67, 76, 79 and 80.

The following compounds were highly effective against the fungi mentioned above:

Compounds of Example 4, 1(a) and 1(b) and compounds Nos. 2, 10, 14 to 17, 20, 21, 35, 41, 59, 60, 62, 65, 71, 74, 85, 97, 99, 104, 108, 110, 111, 114 and 117.

Very good bactericidal effects were also achieved with the compound Nos. 105, 119, 124 and 144.

What is claimed is:

1. A method of destroying gastropods which comprises contacting the gastropods with a gastropodicidally toxic amount of the thiooxanilonitrile of the formula:

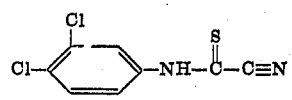

2. A method of destroying gastropods which comprises contacting the gastropods in their water habitat with a gastropodically toxic amount of 3,4-dichlorothiooxanilonitrile.

* * * * *